Oct. 26, 1943.  A. DE MUYSER  2,332,844
RETRACTABLE LANDING GEAR FOR AIRPLANES
Filed July 11, 1939  2 Sheets-Sheet 2

Inventor
Alfred de Muyser
By
Attorneys

Patented Oct. 26, 1943

2,332,844

UNITED STATES PATENT OFFICE 2,332,844

RETRACTABLE LANDING GEAR FOR AIRPLANES

Alfred de Muyser, Luxemburg, Luxemburg; vested in the Alien Property Custodian

Application July 11, 1939, Serial No. 283,844
In Luxemburg January 31, 1939

6 Claims. (Cl. 244—102)

The present invention concerns a retractable landing gear for airplanes. In the following description, I will call "circle," and "edge" the two aspects of the wheel according as it is looked at in the direction of its axle, and perpendicularly to this directon, respectively. At the present time there are retractable landing gears in which each wheel is retracted in the wing or in the fuselage by a turn in the lateral direction, coming to house into a circular cavity of at least the same diameter as the wheel.

It has been found that retraction of the wheel along its circle has at least two aerodynamic drawbacks. The first is that the wheel remains more or less apparent in the cavity because, when it is on the ground, the closure shield cannot be prolonged as far as the ground. Therefore there remains a badly closed hole in the cavity when the wheel is retracted, and this wheel produces eddies which involve an increase of the head resistance.

The second drawback is that this wheel, in the retracted position, is subjected to aerodynamic stresses along its greatest area, which produces very important efforts and makes it necessary to provide very heavy mechanical pieces for resisting these efforts.

It has been endeavoured to avoid these drawbacks by closing the cavity by a sliding flap. However, the risk of this flap getting jammed is such that this solution is generally eliminated.

According to the present invention, it is possible to retract each wheel laterally, while causing it to penetrate into a housing the aperture of which is equal not to the circle of the wheel but to the edge thereof.

For this purpose, according to an essential feature of the invention, the landing gear includes at least two folding systems, one which causes the wheel axle to pivot and the other which brings the wheel into the inside of the fuselage by a displacement such that the plane of its circle is substantially tangent to the pivoting circumference arc of the landing gear. This arrangement has a supplementary advantage since, instead of housing the wheel in the underside of the wing, that is to say at a place where the suction is considerable, it can be housed in the fuselage, at a point protected against eddies. Furthermore, the wheel is in contact with the air streams only along part of its periphery, which is rounded in a manner analogous to the portion of the fuselage the place of which it takes. It follows that it is no longer necessary, nor advisable, to cover the opening of the hole otherwise than by the tire of the wheel itself.

It should be well understood that the invention is not in any way limited to any type of folding device and that, in particular, it is possible to make use, for retraction of the landing gear, either of a self-breaking strut or of any other system.

It will be readily understood that the landing gear according to the invention has many advantages such as: reduction of the section of the opening, position of the wheel in this opening such that the air streams flow along its periphery, positioning of the opening in the fuselage (place where there is no suction) and finally, which is a very considerable advantage, possibility of reduction of the height of the wing at the place where it is jointed to the fuselage, since the wing is no longer intended to receive, in superposed arrangement, the edge of the wheel, the strut, and the associated parts, the wheels being housed, on either side of the engine, in places which are generally not utilized in the case of engines having their cylinders in a row.

Therefore the invention concerns any landing gear for an airplane, laterally retractable, in which at least two rotation movements are produced, about two different axes, one of these movements serving to bring the wheel in a position such that the plane of its circle is substantially tangent to the arc which is to be described in the course of the second rotation movement for retraction purposes.

Preferred embodiments of the present invention will be hereinafter described, with reference to the accompanying drawings, given merely by way of example, and in which.

Figure 1:
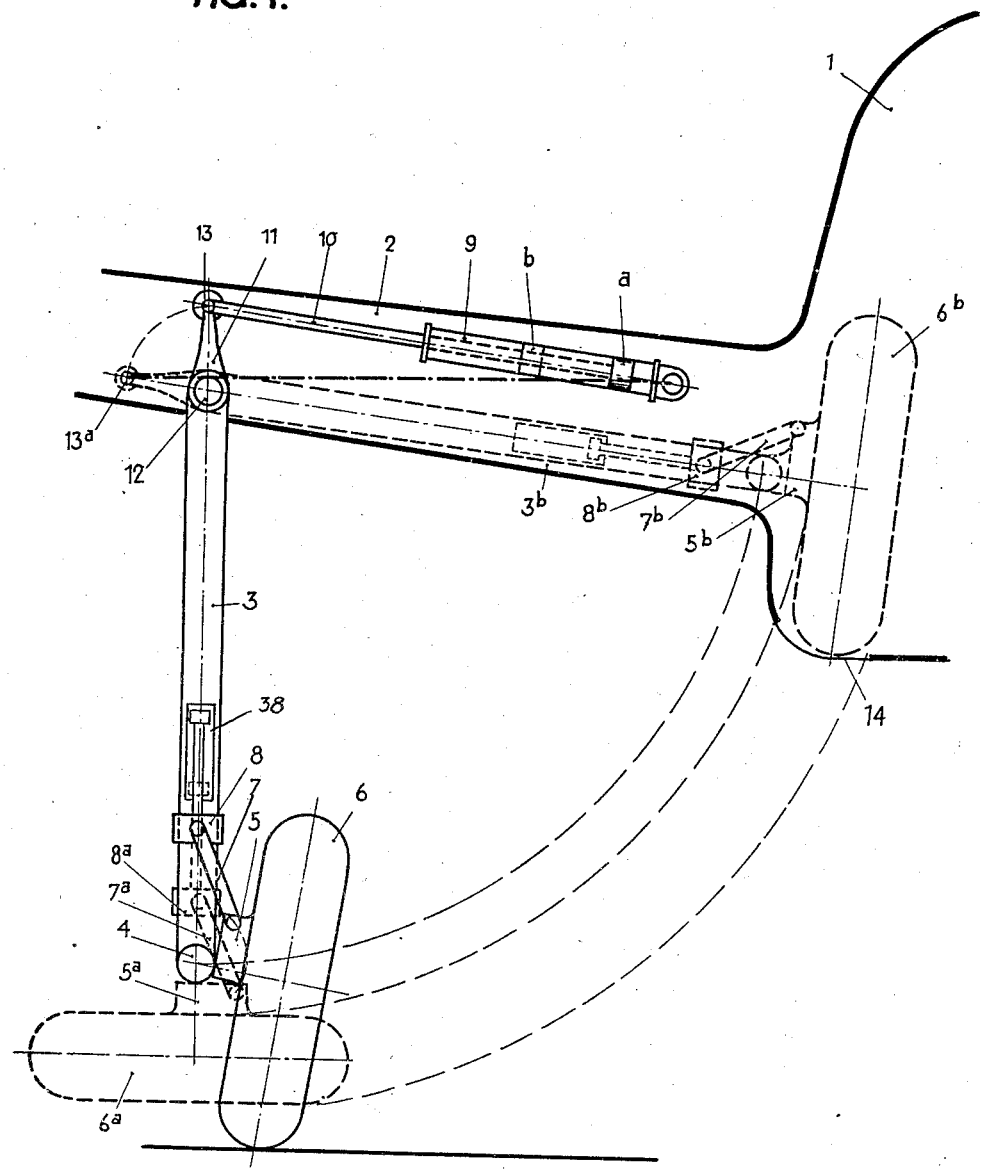
Fig. 1 shows a landing gear made according to the invention.

Referring first to Fig. 1, I is the fuselage of the airplane the lower part of which projects from the lower plane of wing 2. The retractable landing gear includes a strut 3 on the inside of which the shock absorber is housed. At the lower part of this strut, there is pivoted, at 4, a piece 5 which carries wheel 6. This piece 5 is articulated, on the other hand, through a connecting rod 7, to a collar 8 connected to a jack 38 housed on the inside of strut 3.

In Fig. 1, I have shown, in solid lines, the parts in the position they occupy when the airplane is lying or running on the ground. In dotted lines I have shown the position occupied by wheel 6 (which comes into position 6a) and parts 5, 7 and 8 (coming respectively into positions 5a, 7a and 8a after the first pivoting movement.

This first pivoting movement is produced by the jack which controls collar 8 and constitutes the first step of the retraction of the wheel. The jack 38 which produces this movement can be operated in any desired manner, for instance through a system of pipes for oil under pressure.

Once the wheel has been brought into position 6a, I produce the second rotation movement, effected in any suitable manner according to the type of retraction device which is used, which does not in itself constitute an element of the invention.

For the sake of example, in the embodiment of Fig. 1, this second movement is produced by a jack 9 housed in the wing and the rod 10 of which acts upon the end of a lever 11 forming an extension of strut 3 located beyond the axis of articulation 12 of this strut. When the piston a of jack 9 is in position b point 13, which forms the end of lever 11, comes into position 13a. The wheel comes into position 6b and parts 5, 7 and 8 into positions 5b, 7b, and 8b, respectively.

It will be seen that the wheel thus comes to be housed on the inside of the fuselage by penetrating thereinto through an opening 14 the section of which is but slightly greater than that of the edge of the wheel.

Figure 2:
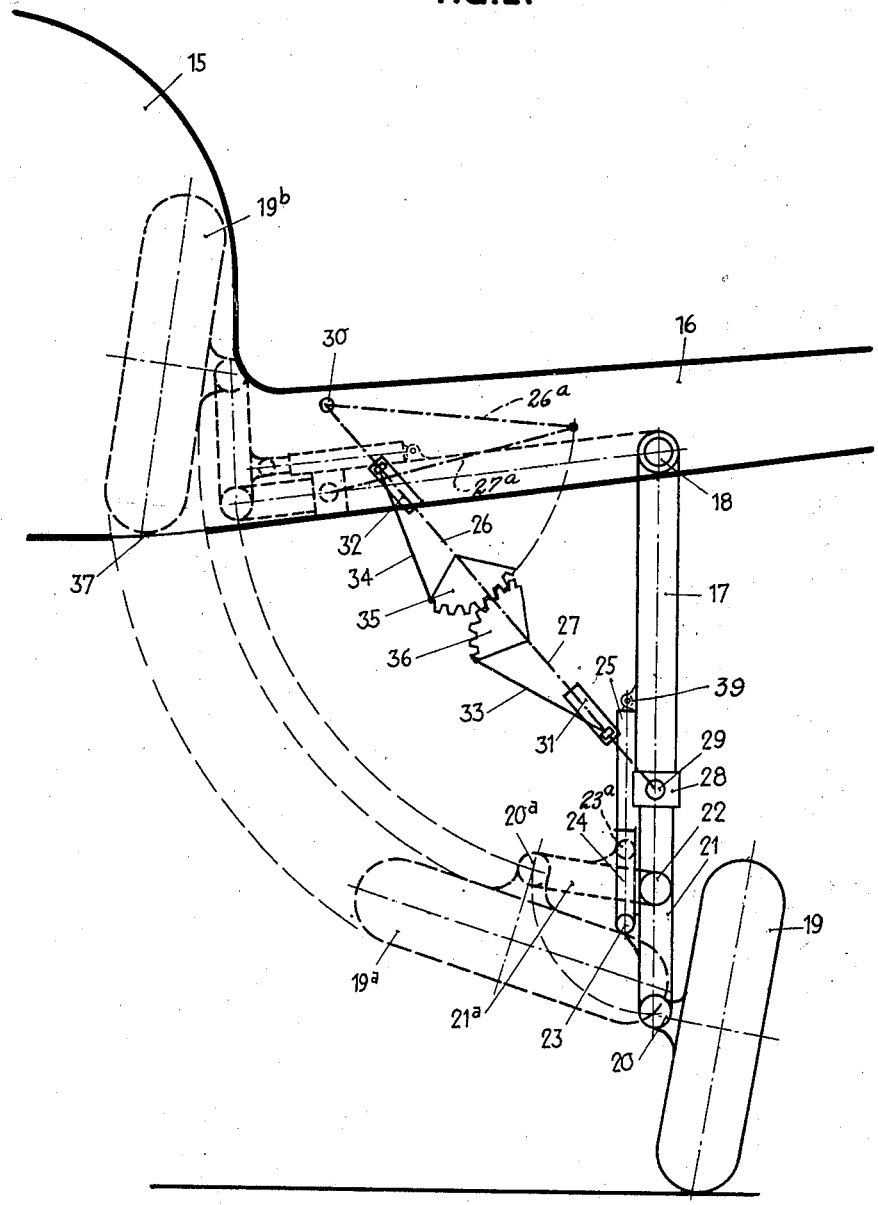
Fig. 2 is a similar view of another embodiment.

In Fig. 2, I have shown another embodiment in which fuselage 15 is arranged in such manner that its lower surface constitutes, so to speak, an extension of the lower plane of wing 16.

In this embodiment 17 is a strut pivoted to the wing at 18. This strut includes the shock absorber and carries, at its lower end the wheel 19 the axle of which is mounted, at 20, on one end of a connecting rod 21, the other end of which is articulated at 22 to the lower end of strut 17. Connecting rod 21 is articulated, on the other side, at a point 23, intermediate along its length, to a rod 24 of a jack 25 pivotally mounted at 39 on strut 17.

The first folding movement, intended to bring wheel 19 into position 19a and parts 20 and 21 into positions 20a and 21a, respectively, is controlled by a jack 25 the rod 24 of which moves upwardly, causing connecting rod 21 to turn about its axis 22, as the connecting point 23 is moved up to the position 23a.

Once the wheel has been brought into position 19a, the landing gear is retracted by a pivoting of strut 17 about axis 18. This pivoting is produced, in the example of Fig. 2, by a self breaking strut, constituted by two rods indicated diagrammatically at 26 and 27. Rod 27 is connected to strut 17 through a collar 28 carrying an articulation axis 29. Rod 26 is pivoted to the airplane at 30. In the example shown, the folding of rod 26—27 is controlled by two jacks 31 and 32 fed for instance with oil under pressure and acting respectively through connecting rods 33 and 34 on toothed sectors 35 and 36.

When the pistons of the jacks move toward each other, the two rod elements are folded to the positions 26a and 27a and strut 17 folds into a recess in the wing, bringing wheel 19 into position 19b.

In this example, aperture 37, provided in the fuselage, is of a width but little greater than the edgewise section of the wheel.

In a general manner, while I have, in the above description, disclosed what I deem to be practical and efficient embodiments of the present invention it should be well understood that I do not wish to be limited thereto as there might be changes made in the arrangement, disposition and form of the parts without departing from the principle of the present invention as comprehended within the scope of the appended claims.

What I claim is:

1. A retractable landing gear for an airplane which comprises, in combination, at least two wheels, a strut supporting each of said wheels and adapted to pass from an extended to a retracted position by pivoting about at least one horizontal axis, articulated means connecting each wheel to the corresponding strut and permitting rotation of said wheel with respect to said strut about an axis parallel to the first mentioned axis but closer to the wheel, actuating means for rotating the wheel about the second mentioned axis with respect to said strut, and actuating means for retracting said strut and wheel.

2. A retractable landing gear for an aircraft, which comprises, in combination, at least two wheels, a strut supporting each of said wheels and adapted to pass from an extended to a retracted position by pivoting about at least one horizontal axis, articulated means connecting each of said wheels with the corresponding strut and adapted to permit rotation of said wheel with respect to said strut about an axis parallel to the first mentioned axis but closer to the wheel, actuating means for rotating the wheel about the second mentioned axis to bring the plane of said wheel into tangent relation to the arc described by said wheel about said first mentioned axis, and actuating means for retracting said strut and wheel.

3. A retractable landing gear for an airplane, which comprises, in combination, at least two wheels, a strut supporting each of said wheels and adapted to pass from an extended to a retracted position by pivoting with respect to said airplane about a horizontal axis parallel to the fore-and-aft direction of the airplane, articulated means connecting each of said wheels with the corresponding strut and adapted to permit rotation of said wheels with respect to their respective struts about an axis parallel to the first mentioned axis but closer to the wheel, actuating means for producing a rotation of each wheel with respect to the corresponding strut about the second mentioned axis to bring the plane of said wheel into tangent relation to the arc described by said wheel about the first mentioned axis, and actuating means for producing the retraction pivoting movement of each said strut and wheel toward the middle vertical plane of the airplane.

4. In an airplane including a fuselage and at least one wing extending on either side of said fuselage, said fuselage being provided with housings at its lower part, a retractible landing gear for said airplane which comprises, in combination, at least two wheels, adapted to be housed edgewise in said housings, a strut supporting each of said wheels and adapted to swing from extended into retracted position, by pivoting about a respective horizontal fore-and-aft axis located close to said wing under surface, articulated means connecting each of said wheels with the corresponding strut and support adapted to permit rotation of said wheels with respect to their respective struts about respective axes each parallel to the corresponding first mentioned axis, but closer to the wheel, actuating means for producing a rotation of each wheel with respect to the corresponding strut about the second mentioned axis to bring the plane of said wheel into tangent relation to the arc described by said wheel about the first mentioned axis, and actuating means for producing subsequently the retraction pivoting movement of said strut and wheel, whereby said wheels are housed edgewise in said housings.

5. A structure according to claim 4 in which the actuating means for producing a rotation of each wheel with respect to the corresponding strut includes a jack carried by each of said struts for normally holding the corresponding wheel axle in a substantially horizontal position, said jack being adapted to bring said axle into a position such that the plane of the wheel is tangent to the arc to be described by the wheel about the axis first mentioned in said claim 4.

6. An airplane including a fuselage and at least one wing extending on either side of said fuselage, said airplane having a cavity in its lower surface, a landing assembly including a landing member of the character which when inverted presents a lower surface having low air resistance, a leverage assembly pivotally connecting said landing assembly to one of said wings and including a strut pivoted to its wing, said leverage assembly being adapted to position said landing member below its wing in position to assist in supporting the airplane, means for swinging said strut about its pivotal connection with its wing to retract said landing member into said cavity including a link portion pivoted to said strut and swinging relative thereto during the retracting operation, said leverage assembly including a link connected through a pivot to said landing member at one end and having its other end extending upwardly and guided by said strut for reciprocation therealong, and a jack for reciprocating said link along said strut thereby to turn said landing member with respect to said strut with the result that when said landing member enters said cavity the landing member is inverted whereby the landing member presents a surface at the open mouth of the cavity which substantially closes the cavity and offers a reduced air resistance.

ALFRED DE MUYSER.